US012158142B2

(12) United States Patent
Belshan et al.

(10) Patent No.: US 12,158,142 B2
(45) Date of Patent: Dec. 3, 2024

(54) SYSTEM AND METHOD FOR MAINTAINING PUMPS

(71) Applicant: SPM Oil & Gas Inc., Fort Worth, TX (US)

(72) Inventors: Daryl Belshan, Weatherford, TX (US); Jacob Brown, Waller, TX (US); James Barnhouse, Spring, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 25 days.

(21) Appl. No.: 17/527,203

(22) Filed: Nov. 16, 2021

(65) Prior Publication Data

US 2023/0151808 A1 May 18, 2023

(51) Int. Cl.

*F04B 53/02* (2006.01)
*E21B 43/26* (2006.01)
*F04B 15/02* (2006.01)
*F04B 19/22* (2006.01)
*F04B 53/14* (2006.01)

(52) U.S. Cl.

CPC ........ *F04B 53/143* (2013.01); *E21B 43/2607* (2020.05); *F04B 15/02* (2013.01); *F04B 19/22* (2013.01); *F04B 53/02* (2013.01); *F05D 2240/55* (2013.01)

(58) Field of Classification Search

CPC .......... F04B 15/00; F04B 15/02; F04B 47/00; F04B 53/02; F04B 53/007; F04B 53/143; F04B 53/18; F04B 53/22; F04B 17/03; F04B 17/06; F04B 23/00; F04B 23/02; F04B 23/025; F04B 49/08; F04B 53/144; F04B 53/146; F04B 53/16; F04B 53/162; F04B 53/164; F16J 15/406; E21B 4/003

USPC .......................................................... 166/122

See application file for complete search history.

(56) References Cited

U.S. PATENT DOCUMENTS 3,506,375 A 4/1970 Endress
7,341,435 B2 3/2008 Vicars
9,016,383 B2 4/2015 Shampine et al.
10,385,841 B2 8/2019 Zhang et al.
2007/0273105 A1* 11/2007 Stanton ................ F04B 53/164 277/500
2011/0239856 A1* 10/2011 Tiller ...................... F04B 53/18 92/153

(Continued)

FOREIGN PATENT DOCUMENTS

WO 2020/186225 A1 9/2020

OTHER PUBLICATIONS

Author: Wheatleygasso.com Title: Wheatley, P323, Triplex, Plunger Pump Date published (mm/dd/yyyy): Jul. 6, 2016 Date accessed: Aug. 4, 2023 Link:https://www.wheatleygaso.com/pumps/p323-triplex-plunger-pump.pdf (Year: 2016).*

(Continued)

*Primary Examiner* — Kenneth J Hansen
*Assistant Examiner* — Chirag Jariwala

(57) ABSTRACT

A system and method for providing one or more pressurized fluid barriers for a fluid end of a reciprocating pump can comprise energization of, using a clean fluid, one or more components provided at distinct different locations of the reciprocating pump to a pressure greater than a cyclical pressure of the reciprocating pump associated with operation of the reciprocating pump to output fracking fluid.

20 Claims, 5 Drawing Sheets

(56) References Cited

U.S. PATENT DOCUMENTS

| | | | | |
|---|---|---|---|---|
| 2018/0291892 | A1* | 10/2018 | Vicars | F04B 1/0461 |
| 2020/0003205 | A1* | 1/2020 | Stokkevåg et al. | F04B 49/02 |
| 2020/0400234 | A1* | 12/2020 | Mullins | F16J 15/406 |
| 2021/0040945 | A1* | 2/2021 | Hurst | F04B 49/08 |

OTHER PUBLICATIONS

Author: Dyson et al. Title: The Elimination of VOC Emissions from a Reciprocating Pump Stuffing Box Date published (yyyy): 2011 Date accessed: Jan. 4, 2024 Link: https://oaktrust.library.tamu.edu/handle/1969.1/162606 (Year: 2011).*

"Pumped Product," Science Direct, Retrieved from the Internet: https://www.sciencedirect.com/topics/engineering/pumped-product, 2021, pp. 1-25.

* cited by examiner

SYSTEM AND METHOD FOR MAINTAINING PUMPS

TECHNICAL FIELD

The present disclosure relates to pumps (e.g., hydraulic fracturing pumps). In particular, the present disclosure relates to systems and methods for maintaining pumps.

BACKGROUND

Hydraulic fracturing or fracking operations are often used during well development in the oil and gas industry. For example, in formations in which oil or gas cannot be readily or economically extracted from the earth, a hydraulic fracturing operation may be performed. Such a hydraulic fracturing operation typically includes pumping large amounts of fracking fluid at high pressure to induce cracks in the earth, thereby creating pathways via which the oil and gas may flow.

Hydraulic fracturing or fracking pumps are typically relatively large positive displacement pumps, usually with two ends, a power end and a fluid end. The power end can include a crankshaft powered by an engine that drives the plungers. The fluid end can include cylinders into which fluid may enter and plungers operate to then forcibly push out the fluid at high pressure to a discharge manifold, which can be in fluid communication with a wellhead. Fracking fluid can be pumped downhole by the fracking pump at a sufficient pressure to cause fractures and fissures to form within the geological formation around the well bore.

Reciprocating components of the pump, such as the plungers, can cause internal pressure to fluctuate from near zero pressure to full pressure (e.g., potentially up to 10,000, 15,000 or 20,000 psi) every cycle. Due to the cyclic, high-pressure loading and the characteristics (e.g., abrasive and/or corrosive) of the fracking fluid, sealing components associated with the plunger can degrade (e.g., wear, break down, erode, etc.) rather quickly, which can lead to fracking fluid leakage and, consequently, reduction in pump performance and potentially ultimately pump failure.

SUMMARY

In an aspect according to embodiments of the present disclosure, a method is described or implemented. The method can comprise energizing a plurality of components provided at distinct different locations of a reciprocating pump to a pressure greater than a cyclical pressure of the reciprocating pump associated with operation of the reciprocating pump, the energizing of the plurality of components using a clean fluid provided thereto; and at the same time as or after starting the energizing the plurality of components, operating the reciprocating pump at the cyclical pressure to output fracking fluid from an output of the cylinder assembly. The energizing the plurality of components using the clean fluid can create a pressurized fluid barrier at each of the plurality of components. At least one of the plurality of components can include a dynamic seal provided around a plunger of the cylinder assembly.

In another aspect according to embodiments of the present disclosure, a fluid end of a reciprocating pump is disclosed or provided. The fluid end can comprise a cylinder assembly provided in a body of a reciprocating pump, the cylinder assembly having a cylinder bore and a reciprocating plunger within the cylinder bore; a plurality of components provided at distinct different locations along the cylinder assembly, the plurality of components including at least one seal to seal the cylinder assembly; and a clean fluid circuit to provide to one or more of the plurality of components pressurized clean fluid to create corresponding one or more pressurized fluid barriers. The pressurized clean fluid can be provided to the one or more of the plurality of components at a first pressure, the first pressure being a predetermined amount greater than a maximum operating pressure of fracking fluid provided through the reciprocating pump.

And in yet another aspect according to embodiments of the present disclosure, a system is disclosed or provided. The system can comprise a hydraulic fracturing pump to output fracking fluid at a first predetermined pressure and according to a predetermined cycle, the hydraulic fracturing pump being a positive displacement pump and including a power end and a fluid end, the fluid end having a plurality of plungers reciprocally provided in respective ones of a plurality of cylinder assemblies in a body of the fluid end of the hydraulic fracturing pump; a first seal and a second seal for each of the plurality of cylinder assemblies, the first seal being a dynamic seal provided around the plunger and the second seal being a static seal provided around a first end cover at a first end of the cylinder assembly; and a clean fluid circuit including a first channel provided in the body to supply clean fluid to the first seal at a minimum of a second predetermined pressure. The second predetermined pressure can be greater than the first predetermined pressure associated with the fracking fluid.

DETAILED DESCRIPTION

As noted above, embodiments of the disclosed subject matter relate to systems and methods for maintaining pumps, for instance, fracturing or fracking pumps.

Figure 1:
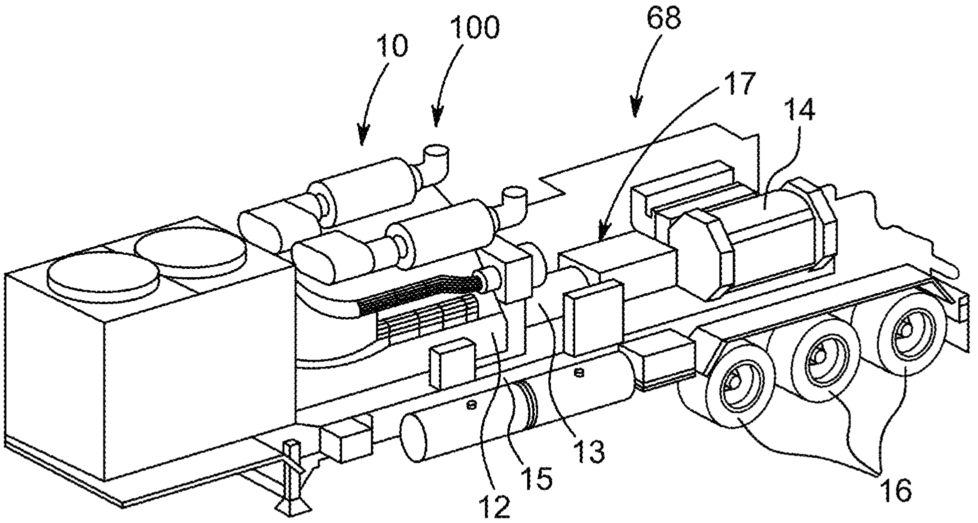
FIG. 1 is a perspective view of a pumping system supported on a trailer for transportation according to one or more embodiments of the present disclosure.

Referring to FIG. 1, an example of a pumping system 10 is illustrated that can be particularly suited for use with geological fracturing processes to recover oil and/or natural gas from the earth. The pumping system 10 may include a prime mover such as an internal combustion engine 12, a transmission 13 that can be operatively connected to and driven by the internal combustion engine 12, and a hydraulic pump 14 that can be operatively connected to and driven by the transmission 13. According to one or more embodiments, the hydraulic pump 14 may be (or may be characterized as) a positive displacement pump.

In one example, the internal combustion engine 12 may be a compression ignition engine that combusts diesel fuel. The hydraulic pump 14 may be configured to pump fracking fluid into the ground to fracture rock layers during the fracturing process. Because the fracturing process may require introduction of fracking fluids at different locations about the fracturing site, the components of the pumping system 10 may be supported on a mobile trailer 15 disposed on wheels 16 to enable transportation of the pumping system 10 about the fracturing site.

The transmission 13 may have a plurality of gears operative between the internal combustion engine 12 and an output shaft of the transmission 13 to alter the rotational speed of the output from the internal combustion engine 12. In some instances, a gear mechanism or coupling 17 (schematically depicted) may be provided between the output shaft of the transmission 13 and an input or drive shaft 21 of the hydraulic pump 14 to further change or reduce the rotational speed between the internal combustion engine 12 and the hydraulic pump 14.

Figure 2:
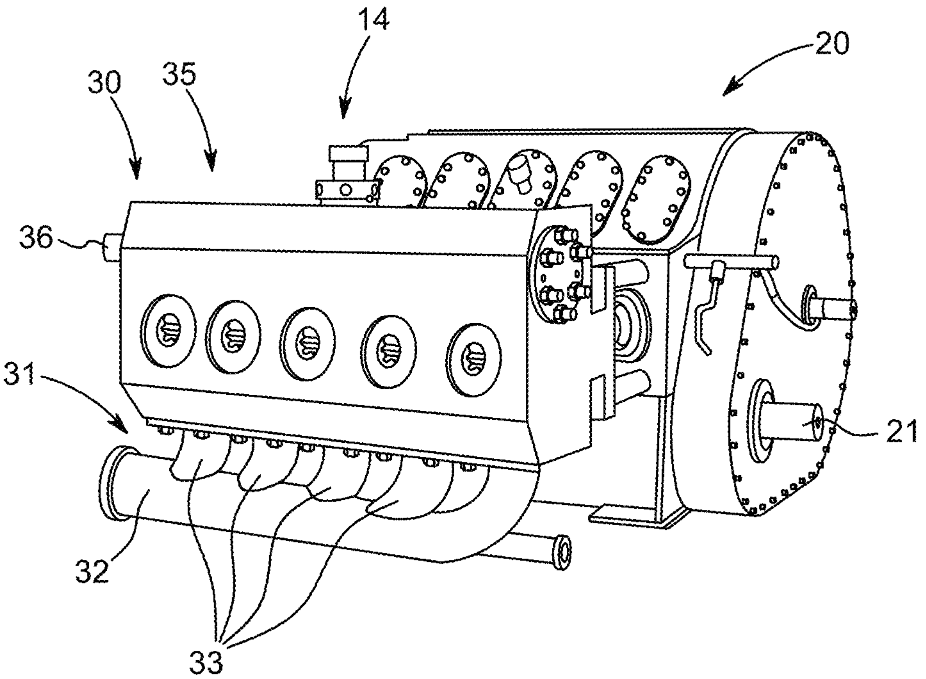
FIG. 2 is a perspective view of a hydraulic pump of the pumping system depicted in FIG. 1 according to one or more embodiments of the present disclosure.

As depicted in FIG. 2, for instance, the hydraulic pump 14 can include a power section 20 and a fluid section 30, which may be referred to as a power end and a fluid end, respectively. The power section 20 may include the input shaft 21 operatively connected to and driven by the transmission 13. The input shaft 21 may be operatively connected to a crankshaft through gears or other structure or mechanisms to convert rotational movement of the input shaft 21 into a linear movement at the fluid section 30 of the hydraulic pump 14.

Figure 3:
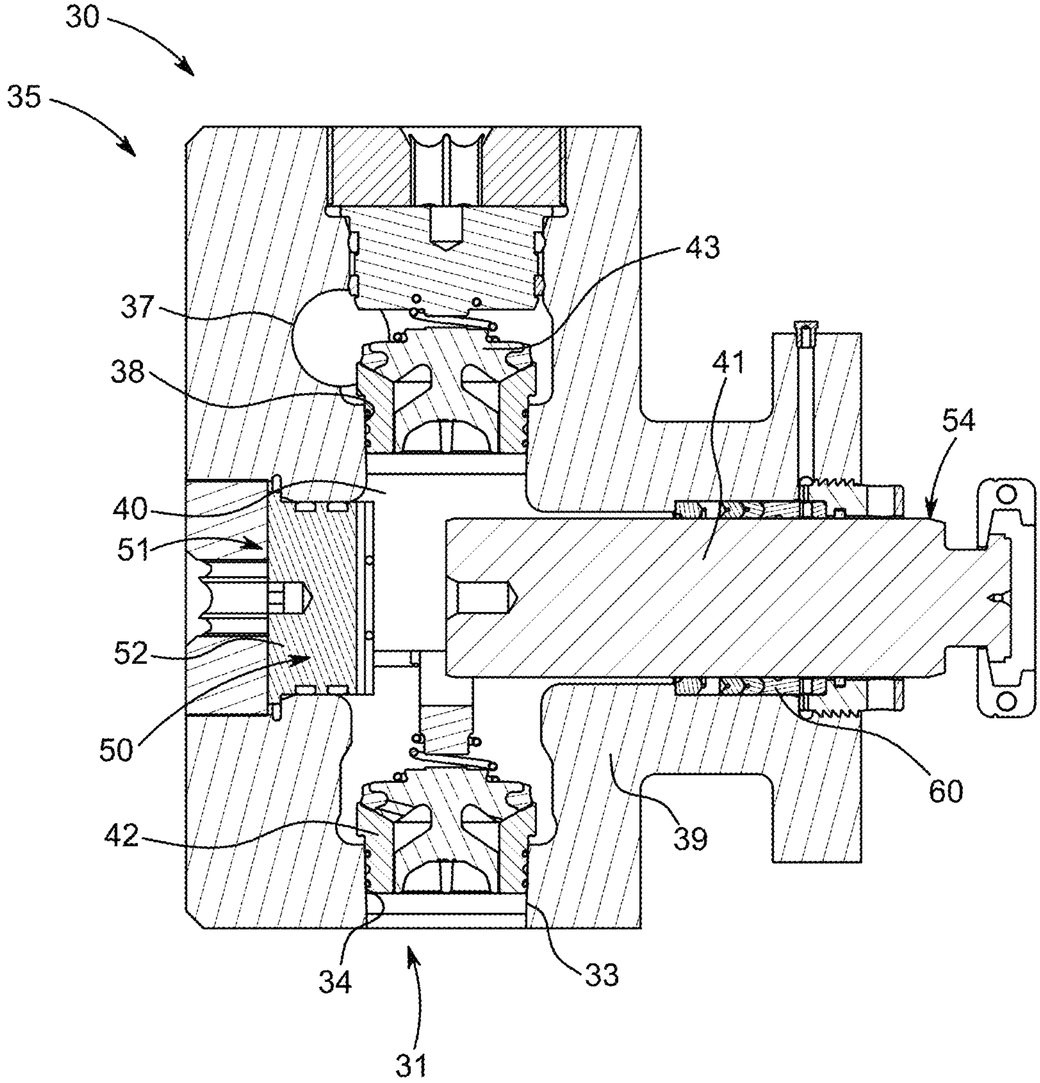
FIG. 3 is a sectional view of a portion of a fluid section of the hydraulic pump depicted in FIG. 2 according to one or more embodiments of the present disclosure.

Referring to FIG. 2 and FIG. 3, the fluid section 30 may include an inlet end 31 and an outlet end 35 spaced from the inlet end 31, with one or more cylinders 40 (e.g., five) disposed between the inlet end 31 and the outlet end 35. Each cylinder 40 may be provided or formed in a body 39 of the fluid section 30 or the hydraulic pump 14. As such, each cylinder 40 may be referred to or characterized as a cylinder bore. Each cylinder 40 may include a reciprocating member such as a reciprocating element 41 disposed for reciprocating sliding movement therein. The reciprocating element 41 may be a plunger or a piston, for instance. At least the cylinder 40 and the reciprocating element 41 can be referred to or characterized as a cylinder assembly 50.

Referring to FIG. 2, an inlet conduit may be fluidly connected to an inlet manifold 32 positioned at the inlet end 31. The inlet manifold 32 may include one or a plurality of inlet lines 33, with each inlet line 33 being fluidly connected to one of the cylinders 40. As shown in FIG. 3, for instance, the inlet end 31 may include a suction or inlet valve 42 positioned along an inlet wall 34 between each inlet line 33 and its associated cylinder 40. Here, in FIG. 3, in a case where the fluid end 30 includes multiple cylinders 40 the cylinders 40 may be behind and/or in front of the cylinder 40 shown in FIG. 3. In one embodiment, the inlet valve 42 may be biased in a closed condition or position and moved to an open position to permit fracking fluid to pass therethrough.

Referring to FIG. 2 and FIG. 3, a discharge or outlet conduit 36 may be fluidly connected to an outlet 37 positioned at the outlet end 35. The outlet conduit 36 may be fluidly connected to the cylinders 40. Likewise, each outlet 37 may be fluidly connected to a corresponding one of the cylinder 40, for instance, at a location opposite one of the inlet line(s) 33 associated with the same cylinder 40. As shown in FIG. 3, for instance, the outlet end 35 may include a discharge or outlet valve 43 positioned along outlet wall 38 between each cover or gauge port and its associated cylinder 40. In one embodiment, the outlet valve 43 may be biased in a closed condition or position and moved to an open position to permit fracking fluid to pass therethrough upon the reciprocating element 41 generating a sufficient or high enough pressure.

During a pumping process, operation of the internal combustion engine 12 can drive rotation of the transmission 13 and ultimately rotation of the input shaft 21 of the hydraulic pump 14. Rotation of the input shaft 21 can cause reciprocating movement of the reciprocating element 41 within the cylinder 40 (including multiple reciprocating elements 41 and corresponding respective cylinders 40). The reciprocating movement of the reciprocating element 41 may allow fracking fluid to flow through the inlet manifold 32 from the inlet conduit and into the cylinder(s) 40 through the inlet line(s) 33 and past the inlet valve(s) 42. Fracking fluid can be driven by the reciprocating element(s) 41 past the outlet valve(s) 43 and into the outlet(s) 37. The fracking fluid, which can contain water, proppants (e.g., sand), and other additives, can be output from the fluid end 30 based on or at a predetermined pressure and according to a predetermined cycle of the reciprocating element 41. The predetermined pressure, which may be referred to or characterized as a maximum operating pressure of or applied to the fracking fluid, can be at or about 10,000 psi, as but one example.

Figure 4:
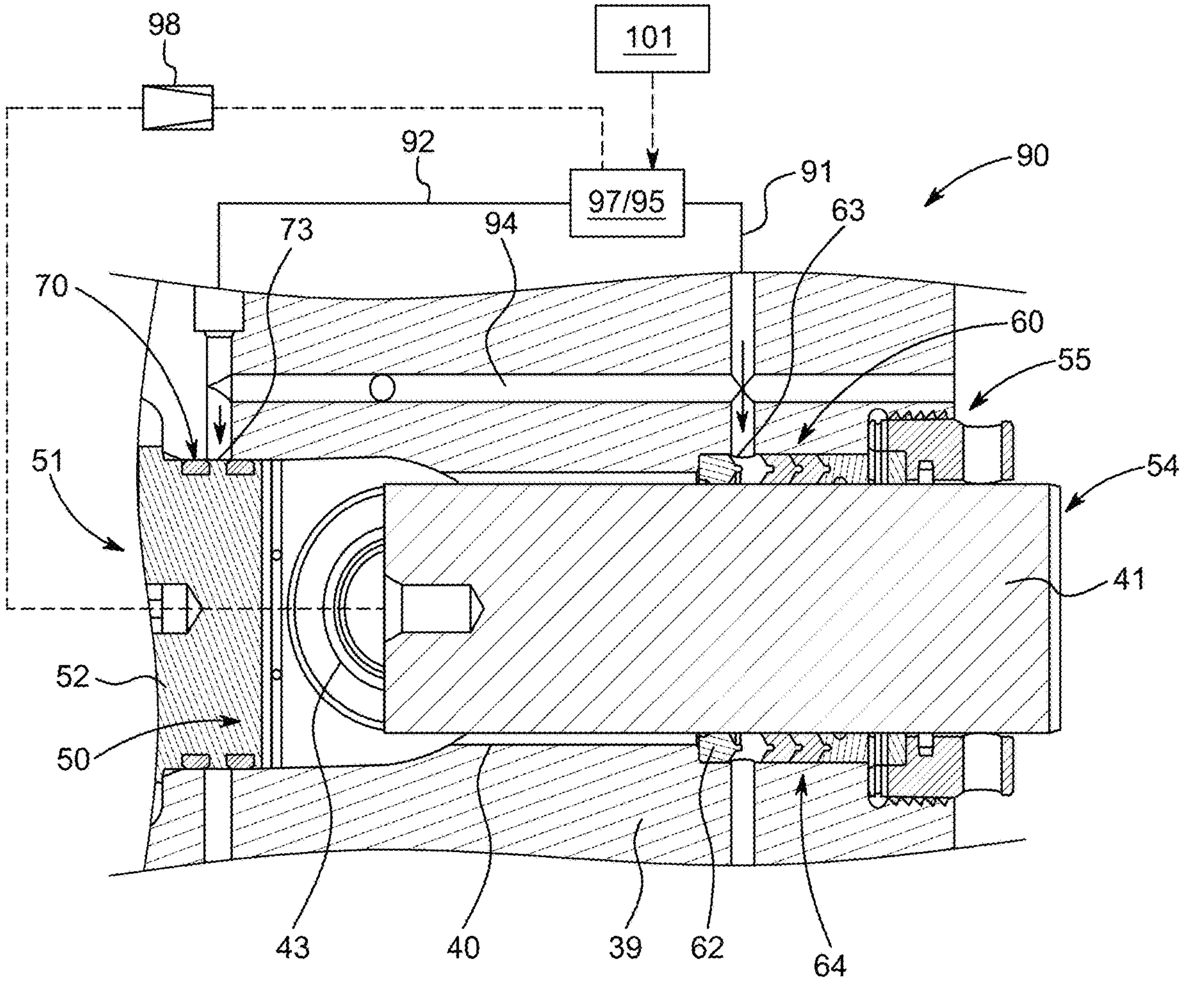
FIG. 4 is a sectional view of a portion of a system of a fluid section of the hydraulic pump of FIG. 2, according to one or more embodiments of the present disclosure.
Figure 5:
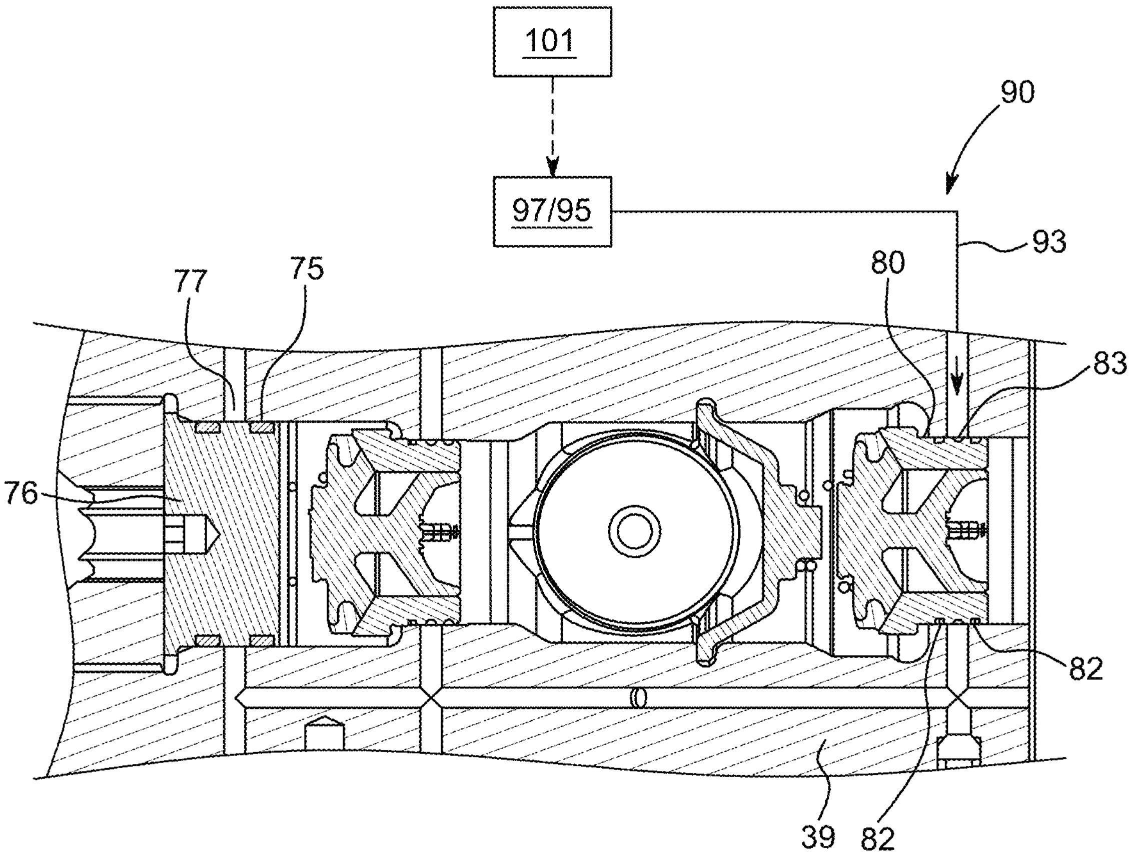
FIG. 5 is a sectional view of another portion of the system of the fluid section of FIG. 4, according to one or more embodiments of the present disclosure.

Optionally, the pumping system 10 may be controlled, at least in part, by a control system 100 as shown generally in FIG. 1. The control system 100 may include an electronic control module (ECM) or controller 101, such as shown in FIG. 4 and FIG. 5, and may contain a plurality of sensors. The controller 101 may control various operations of the pumping system 10.

The controller 101 may be an electronic controller that operates to perform operations, execute control algorithms, store, retrieve, and access data, and other desired operations. The controller 101 may include or access memory, secondary storage devices, processors, and any other components for running one or more applications. The memory and secondary storage devices may be in the form of read-only memory (ROM) or random access memory (RAM) or integrated circuitry that is accessible by the controller 101. Various other circuits may be associated with the controller 101 such as power supply circuitry, signal conditioning circuitry, driver circuitry, and other types of circuitry. The controller 101 may be referred to or characterized as control circuitry according to one or more embodiments of the disclosed subject matter.

The controller 101 may be a single controller or may include more than one controller disposed to control various functions and/or features of the pumping system 10. The term "controller," as used herein, is used in its broadest sense to include one or more controllers and/or microprocessors that may be associated with the pumping system 10 and that may cooperate in controlling various functions and operations of the pumping system 10. The functionality or operations of the controller 101 may be implemented in hardware and/or software without regard to the functionality. The controller 101 may rely on one or more data maps relating to the operating conditions and the operating environment of the pumping system 10 and the work site at which the pumping system 10 is operating that may be stored in the memory of or associated with the controller 101. Each of these data maps may include a collection of data in the form of tables, graphs, and/or equations. The control system 100 and controller 101 may be located on the trailer 15 or may be distributed with components also located remotely from or off-board the trailer 15.

Pumping system 10 may be equipped with a plurality of sensors that provide data indicative (directly or indirectly) of various operating parameters of elements of the system and/or the operating environment in which the system is operating. The term "sensor," as used herein, is used in its broadest sense to include one or more sensors and related components that may be associated with the pumping system 10 and that may cooperate to sense various functions, operations, and operating characteristics of the element of the pumping system 10 and/or aspects of the environment in which the pumping system 10 is operating.

A plurality of components can be provided at distinct different axial locations along the cylinder assembly 50, for instance, at one or both of a first end portion 51 and a second end portion 54 of the cylinder assembly 50 and/or between the first end portion 51 and the second end portion 54.

The plurality of components can include at least one seal. As shown in FIG. 2 and FIG. 3, for instance, the plurality of components can include an annular first seal 60 to seal a portion of the cylinder assembly 50, for instance, to prevent fracking fluid from leaking or undesirably escaping from the cylinder 40, at least during the fracking operation of the hydraulic pump 14. The first seal 60 can be part of a packing assembly or stuffing box and can be disposed in the cylinder 40 to prevent leakage of the fracking fluid from around the reciprocating element 41 (e.g., plunger) during operation of the hydraulic pump 14. Optionally, the first seal 60 may be considered part of the cylinder assembly 50, as may some or all of the packing assembly. The first seal 60 may be disposed axially inward of the second end portion 54 of the cylinder assembly 50, such as shown in FIG. 3 and FIG. 4. Thus, the first seal 60 may be disposed axially between the first end portion 51 and the second end portion 54 of the cylinder assembly 50.

As shown in FIG. 3 and FIG. 4, for instance, the first seal 60 can be provided around the reciprocating element 41 (e.g., disposed radially between an outer cylindrical surface of the reciprocating element 41 and portion of a cylindrical sidewall defining the cylinder 40). The reciprocating element 41 can move, particularly slidingly within the cylinder 40, relative to the first seal 60. Thus, the first seal 60 may be referred to or characterized as a dynamic seal, as opposed to a seal that does not abut or otherwise interact with a moving component or move relative to a component during operation. According to one or more embodiments, the first seal 60 can include a plurality of sealing components. For instance, as shown in FIG. 4, the first seal 60 can include a header ring 62 and one or more pressure seals 64 (e.g., gasket(s), V-seal, lining ring(s), oil ring(s), etc.). Alternatively, the first seal 60 may include only one sealing component.

An end cover or packing nut 55, which may be referred to as a second end cover or packing nut, can be provided at the second end portion 54 of the cylinder assembly 50 to enclose that end of the cylinder assembly 50. Of course, the reciprocating element 41 may extend through the end cover 55, such as shown in FIG. 4.

According to one or more embodiments, an inlet port 63 may be provided, for instance, as a gap or space disposed axially between the header ring 62 and the pressure seal(s) 64. Discussed in more detail later, the inlet port 63 may be provided to receive a pressurized clean fluid (e.g., oil or water) to form or create a pressurized fluid barrier at (e.g., around) the first seal 60. Providing such pressurized clean fluid may be referred to or characterized as energizing the first seal 60.

The plurality of components can also include an annular second seal 70, which may be provided at the first end portion 51 of the cylinder assembly 50, such as shown in FIG. 3 and FIG. 4. The second seal 70 can be disposed circumferentially around an outer cylindrical surface of a first end cap or cover 52 at the first end portion 51 of the cylinder assembly 50. The second seal 70 may be referred to or characterized as a static seal, for instance, because neither the second seal 70 nor the first end cover 52 may move relative to one another during operation of the hydraulic pump 14.

The second seal 70 may define or otherwise be provided at an inlet port 73. The inlet port 73, which may be or include an axial gap or space, can receive a pressurized clean fluid (e.g., oil or water) to form or create a pressurized fluid barrier at (e.g., around) the second seal 70. Providing such pressurized clean fluid may be referred to or characterized as energizing the second seal 70. According to one or more embodiments, the second seal 70 can define the axial gap or space. For instance, the second seal 70 may comprise or consist of two seals (e.g., sealing rings, such as gaskets), or two seal portions, spaced axially from each other and disposed circumferentially around the first end cover 52, such as shown in FIG. 4.

The plurality of components can also include an annular third seal 75, which may be provided at the outlet end 35 of the fluid section 30, such as shown in FIG. 5. The third seal 75 can be disposed circumferentially around an outer cylindrical surface of a third end cap or cover 76 coupled to the body 39. The third end cover 76 may be disposed downstream of the outlet valve 43. The third end cover 76 may be coaxially aligned with the outlet valve 43. The third seal 75 may be referred to or characterized as a static seal, for instance, because neither the third seal 75 nor the third end cover 76 may move relative to one another during operation of the hydraulic pump 14.

The third seal 75 may define or otherwise be provided at an inlet port 77. The inlet port 77, which may be or include an axial gap or space, can receive a pressurized clean fluid (e.g., oil or water) to form or create a pressurized fluid barrier at (e.g., around) the third seal 75. Providing such pressurized clean fluid may be referred to or characterized as energizing the third seal 75. According to one or more embodiments, the third seal 75 can define the axial gap or space. For instance, the third seal 75 may comprise or consist of two seals (e.g., sealing rings, such as gaskets), or two seal portions, spaced axially from each other and disposed circumferentially around the third end cover 76, such as shown in FIG. 5.

The plurality of components can also include a valve seat 80, such as shown in FIG. 5. Optionally, as shown in FIG. 5, for instance, one or a plurality of annular seals 82 (e.g., gaskets) can be provided circumferentially around the valve seat 80. Such seal(s) 82 may be referred to or characterized as static seals. The valve seat 80 may define or otherwise be provided at an inlet port 83. The inlet port 83, which may be or include an axial gap or space, can receive a pressurized clean fluid (e.g., oil or water) to form or create a pressurized fluid barrier at (e.g., around) the valve seat 80. Providing such pressurized clean fluid may be referred to or characterized as energizing the valve seat 80. According to one or more embodiments, the valve seat 80 can define the axial gap or space.

Referring to FIG. 4 and FIG. 5, a clean fluid circuit 90 can be provided at least partially within the hydraulic pump 14. Generally, the clean fluid circuit 90 can comprise one or more channels or conduits to supply the clean fluid to corresponding one or more of the components provided at the distinct different locations along the cylinder assembly 50, a reservoir 95 to store and supply the clean fluid to the one or more channels, and a pump 97 to pressurize the clean fluid from the reservoir 95 and provide pressurized clean fluid to the one or more channels. Some or all of the clean fluid circuit 90 can be distinct and separate from the fluid circuit of the hydraulic pump 14 associated with pumping the fracking fluid. For instance, at least the one or more channels and the reservoir 95 may be completely distinct and separate from the fluid circuit of the hydraulic pump 14 associated with pumping the fracking fluid.

In FIG. 4 and FIG. 5 the reservoir 95 and pump 97 are shown diagrammatically, however, such components may be distinct and different components of the clean fluid circuit 90. Generally, the pressurized clean fluid provided through the one or more channels can be provided at corresponding one or more of the components to create respective pressurized fluid barriers at the one or more components.

The one or more channels, which can be provided or formed in the body 39 of the fluid section 30 or the hydraulic pump 14, can include a first channel 91. The first channel 91 can extend from the reservoir 95 to the first seal 60, for instance, to the inlet port 63 associated with or otherwise formed by the first seal 60. Individual first channels 91, or portions of the first channel 91, may be in fluid communication with the first seal 60 of each cylinder assembly 50 (in a case with multiple cylinder assemblies 50). For instance, FIG. 4 shows the first channel 91 extending (e.g., downward) past the first seal 60, which is meant to indicate that the first channel 91, or another portion of the first channel 91, can extend to one or more additional first seals 60 to provide the clean fluid to the additional first seal(s) 60.

Additionally or alternatively, the one or more channels can include a second channel 92. The second channel 92 can extend from the reservoir 95 to the second seal 70, for instance, to the inlet port 73 associated with or otherwise formed by the second seal 70. Individual second channels 92, or portions of the second channel 92, may be in fluid communication with the second seal 70 of each cylinder assembly 50 (in a case with multiple cylinder assemblies 50). For instance, FIG. 4 shows the second channel 92 extending (e.g., downward) past the second seal 70, which is meant to indicate that the second channel 92, or another portion of the second channel 92, can extend to one or more additional second seals 70 to provide the clean fluid to the additional second seal(s) 70.

Additionally or alternatively, referring to FIG. 5, the one or more channels can include a third channel 93. The third channel 93 can extend from the reservoir 95 to the valve seat 80, for instance, to the inlet port 83 associated with or otherwise formed by the valve seat 80. Individual third channels 93, or portions of the third channel 93, may be in fluid communication with the valve seat 80 of each cylinder assembly 50 (in a case with multiple cylinder assemblies 50). For instance, FIG. 5 shows the third channel 93 extending (e.g., downward) past the valve seat 80, which is meant to indicate that the third channel 93, or another portion of the third channel 93, can extend to one or more additional valve seats 80 to provide the clean fluid to the additional valve seat(s) 80.

Thus, according to embodiments of the disclosed subject matter, the clean fluid circuit 90 can include the first channel 91, the second channel 92, and/or the third channel 93. In the case of multiple ones (i.e., some or all) of the first channel 91, the second channel 92, and the third channel 93 being implemented, some or all of the first channel 91, the second channel 92, and the third channel 93 can be distinct, for instance, completely separate from each other, and extending directly from the reservoir 95 and/or pump 97. Alternatively, some or all of the first channel 91, the second channel 92, and the third channel 93 can be connected to each other. For instance, FIG. 4 shows the first channel 91 and the second channel 92 being connected via a connecting channel 94. Optionally, a valve, which may be controlled by the controller 101, may be between the different channels (e.g., disposed on the connecting channel 94 between the first channel 91 and the second channel 92) to selectively fluidly connect the different channels.

The reservoir 95, as noted above, can store the clean fluid for supply to the one or more channels, particularly the first channel 91, the second channel 92, and/or the third channel 93. The clean fluid may be oil or clean water, as examples. According to one or more embodiments, the reservoir 95 may be shared with another system of the pumping system 10. For instance, the reservoir 95 may be an oil reservoir (e.g., 100 gallons or more) that also provides oil for cooling and to lubricate the gears and bearings of the power end 20 of the hydraulic pump 14. Alternatively, the reservoir 95 may be dedicated exclusively to the clean fluid circuit 90. Providing the reservoir 95 that is dedicated exclusively to the clean fluid circuit 90 can prevent or minimize contamination by the fracking fluid compared to a case where the reservoir 95 is shared by multiple fluid systems.

The pump 97, as noted above, can pressurize the clean fluid from the reservoir 95 and provide pressurized clean fluid to the one or more channels, particularly to energize the corresponding one or more components (e.g., the first seal 60, the second seal 70, and/or the valve seat 80) with the pressurized clean fluid and create respective one or more pressurized fluid barriers.

The pressure of the clean fluid can be greater than the pressure associated with the fracking fluid during operation of the hydraulic pump 14. The pressure associated with the clean fluid may be referred to herein as a second predetermined pressure, whereas the pressure associated with the fracking fluid during operation of the hydraulic pump 14 may be referred to as a first predetermined pressure. The first predetermined pressure may be cyclical in nature, for instance, wherein a maximum pressure of the cycle may be referred to herein as a maximum operation pressure of the hydraulic pump 14. According to embodiments of the disclosed subject matter, the second predetermined pressure can be always greater than the first predetermined pressure, even as the first predetermined pressure may fluctuate as the reciprocating element 41 moves within the cylinder 40. Thus, providing the pressurized clean fluid to one or more of the components (e.g., the first seal 60, the second seal 70, and/or the valve seat 80) can cause the component(s) to be energized fewer times compared to a number of pressure cycles associated with reciprocation of the reciprocating element 41 within the cylinder 40 of the cylinder assembly 50. For instance, such energizing may cause the component(s) to flex only once during an operation of the hydraulic pump 14, even as the first pressure may fluctuate as the reciprocating element 41 moves within the cylinder 40.

The second predetermined pressure associated with the clean fluid may be a predetermined amount above the first predetermined pressure. For instance, the second predetermined pressure may be 20 psi or more above the first predetermined pressure (e.g., 10,020 psi versus 10,000 psi, respectively). According to one or more embodiments, the pressurized clean fluid can be provided to multiple (e.g., all) of the components at a same pressure, i.e., at the same pressure above the first predetermined pressure associated with the fracking fluid during operation of the hydraulic pump 14. Alternatively, one or more (e.g., all) of the second predetermined pressures may be different for the different components. Thus, the clean fluid can be provided at a pressure at least at the second predetermined pressure, where the second predetermined pressure can be the lowest pressure of the different pressures for the clean fluid provided under pressure to the different components.

According to one or more embodiments, the pump 97 may be exclusive to the first channel 91, the second channel 92, and the third channel 93. That is, the pump 97 may not be shared with another fluid system, such as the fluid system associated with providing oil to the power end 20 of the hydraulic pump 14. According to one or more embodiments, the pump 97 may not be associated with the fluid circuit for processing the fracking fluid. Thus, the pump 97 may be considered to be or characterized as being different from the hydraulic pump 14.

Alternatively, according to one or more embodiments, the discharge pressure from the output of the hydraulic pump 14, for instance, one or more of the outlet(s) 37 or the outlet conduit 36, may be used to pressurize the clean fluid at or above the second pressure in order to provide the pressurized clean fluid to the components (e.g., the first seal 60, the second seal 70, and/or the valve seat 80). As an example, and as shown diagrammatically in FIG. 4, an intensifier 98, for instance, a spool with a differential area can be provided in fluid communication with the output of the hydraulic pump 14 and can be operative to magnify the pressure associated with the fracking fluid, i.e., the first predetermined pressure, by a predetermined amount to create the second predetermined pressure of the clean fluid. Thus, in effect, the intensifier 98 can be the pump 97 and a separate pump to pressurize the clean fluid may not be necessary. This can better ensure that no matter what the discharge pressure is of the hydraulic pump 14 the pressure for the clean fluid can always be greater. In this alternative example, the controller 101 may not be implemented. Here, the discharge pressure from the fluid end, e.g., from the outlet conduit 36, can be used to control the pump 97 to make the pump 97 output the clean fluid at a pressure above the discharge pressure of the fracking fluid output at the fluid end. Linking the clean fluid circuit to the discharge pressure through the intensifier 98 can set a baseline (or minimum) pressure for the clean fluid at least to the level of the discharge pressure in order to provide positive pressure to the seals with or without the pump 97.

The controller 101 can be operatively coupled to the pump 97 and control components (e.g., valves, etc.) of the clean fluid circuit 90 that control flow of the clean fluid through the one or more channels. The controller 101 can control the clean fluid circuit 90 to provide the pressurized clean fluid to one or more of the components at least at the same time as (e.g., before) the start of a pumping operation of the hydraulic pump 14 to pump fracking fluid. The controller 101 may also continue to control the clean fluid circuit 90 to provide the pressurized clean fluid to one or more of the components at any time when the hydraulic pump 14 is pumping fracking fluid. The controller 101 may control the clean fluid circuit 90 to stop providing the pressurized clean fluid to one or more of the components when the hydraulic pump 14 stops pumping fracking fluid.

According to one or more embodiments, the controller 101 may control the clean fluid circuit 90 to provide the pressurized clean fluid to one or more of the components according to a predetermined priority. For instance, the first seal 60 may have the highest priority of the components and may be the only or the first component provided with the pressurized clean fluid. The second seal 70 and/or the valve seat 80 may be assigned priority below the first seal 60. Of course, according to one or more embodiments, all components (e.g., the first seal 60, the second seal 70, and the valve seat 80) can have the same priority and hence the pressurized clean fluid can be provided initially at the same time. On the other hand, according to one or more embodiments, the pressurized clean fluid can be provided only to any one of the components at one time. According to one or more embodiments, the controller 101 can stop providing the pressurized clean fluid to one or more of the components (e.g., all of them) even if the engine that may be used to drive the hydraulic pump 14 is still running. Stopping the pressurized clean fluid to the one or more components may depressurize the clean fluid circuit 90.

INDUSTRIAL APPLICABILITY

As noted above, embodiments of the disclosed subject matter can relate to systems and methods for maintaining pumps, for instance, fracturing or fracking pumps. Maintaining, in this context, can involve preventing or minimizing wear of components associated with the pump during high cyclic loads.

Generally, embodiments of the disclosed subject matter can provide a pressurized fluid barrier system for hydraulic fracturing fluid ends of a fracturing pump. For instance, embodiments of the disclosed subject matter can use a clean, pressurized fluid to energize components (e.g., seals) to a pressure higher than the cyclical pressure of the fracturing pump, which can energize the components once, regardless of how many cycles are run during a stage. Plus, having the clean fluid on the back side of component(s) (e.g., opposite a front side that is configured to be in contact with the fracking fluid) can create a barrier to prevent or minimize proppant (e.g., including sand) ingression between the component(s) and the housing (e.g., body 39), which can prevent the proppant from wearing out the housing (e.g., washboarding). In the case of one of the components being a valve seat (e.g., valve seat 80), such barrier may be used to aid in valve closing, particularly dampening valve impact, which may reduce the wear due to impact damage as well as prevent or minimize washing around the seat. The clean fluid may also act as a lubricant for any dynamic seals (e.g., first seal 60), which may increase the life of the housing in other ways.

Here, the pressure at which the clean fluid is provided can be greater than the pressure of the fracking fluid as the pump operates to pump fracking fluid. This can prevent the fracking fluid (and hence the proppant) from breaching the component (e.g., seal). Moreover, in the event that fracking fluid or at least proppant exists between the component and the housing/body, for instance, the pressurized clean fluid can push the fluid/proppant toward and into the inner volume of the cylinder 40.

According to one or more embodiments, systems and methods can include introducing a clean pressurized fluid, such as oil, using a plurality of channels disposed within a pump housing. The system and method can include utilizing the clean pressurized for energizing one or more components, such as one or more seals. The system and method can include creating a barrier of the clean pressurized fluid between the component(s) and a pump housing. If that clean fluid applied to the back side(s) of the component(s) is pressurized to a pressure greater than the pump operating fluid (i.e., the fluid acting on the opposite side of the seal), the component(s) can be compressed only once rather than during each pumping cycle.

Figure 6:
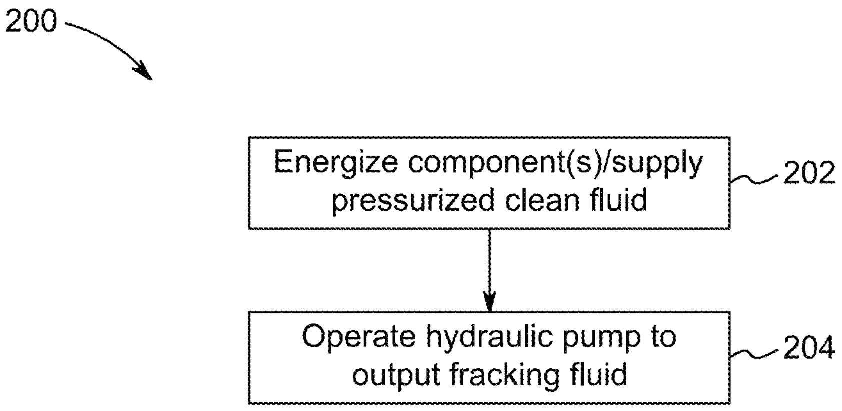
FIG. 6 is a flow chart of a method according to one or more embodiments of the present disclosure.

FIG. 6 is a flow chart of a method 200 according to one or more embodiments of the present disclosure. Some or all of the method 200 may be performed under control of the controller 101.

The method 200, at 202, can include energizing one or more components, which can be provided at distinct different locations along a cylinder assembly of a reciprocating pump, to a pressure greater than a cyclical pressure of the reciprocating pump associated with operation of the reciprocating pump using a clean fluid provided to back sides of the component(s). As noted above, the components may be or include the first seal 60, the second seal 70, and/or the valve seat 80. The reciprocating pump may be the hydraulic pump 14. The energizing using the clean fluid can create a pressurized fluid barrier at each of the components.

The method, at 204, can include, at the same time as or after starting the energizing of the plurality of components, operating the reciprocating pump at the cyclical pressure to output fracking fluid from an output of cylinder assembly.

Stopping the energizing of the plurality of components can depressurize the clean fluid system. Deenergizing the system can be performed at the same time as or after stopping the reciprocating pump from outputting the fracking fluid.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The invention claimed is:

1. A system comprising:
a hydraulic fracturing pump to output fracking fluid at a first predetermined pressure and according to a predetermined cycle, the hydraulic fracturing pump being a positive displacement pump and including a power end and a fluid end, the fluid end having a plurality of plungers reciprocally provided in respective ones of a plurality of cylinder assemblies in a body of the fluid end of the hydraulic fracturing pump;
a first seal and a second seal for each of the plurality of cylinder assemblies, the first seal being a dynamic seal provided around the respective plunger and the second seal being a static seal provided around a first end cover at a first end of the respective cylinder assembly;
a clean fluid circuit including a first channel provided in the body to supply clean fluid to the first seal at a minimum of a second predetermined pressure, the second predetermined pressure being greater than the first predetermined pressure associated with the fracking fluid; and
a second channel provided in the body to supply the clean fluid to the second seal at the minimum of the second predetermined pressure.

2. The system of claim 1,
wherein the supply of clean fluid, from the first channel, is communicated to the first seal via an inlet port that is disposed axially between a header ring, of the first seal, and a pressure seal, of the first seal.

3. The system according to claim 1, further comprising:
a reservoir to store the clean fluid; and
a pump to pressurize the clean fluid to the second predetermined pressure.

4. The system according to claim 3, further comprising a controller operatively coupled to the pump that pressurizes the clean fluid, wherein the controller is configured to control the pump to provide the clean fluid to the first seal and the second seal.

5. The system according to claim 1, wherein the second channel is shared by all of the plurality of cylinder assemblies.

6. The system according to claim 1, wherein the first channel is shared by all of the plurality of cylinder assemblies.

7. The system according to claim 1, wherein the clean fluid provided at the minimum of the second predetermined pressure to the first seal causes the first seal to be energized fewer times compared to a number of pressure cycles in the cylinder assembly in association with operation of the hydraulic fracturing pump to output the fracking fluid at the first predetermined pressure and according to the predetermined cycle.

8. The system according to claim 1,
wherein the first seal includes a plurality of seals, and
wherein the clean fluid at the minimum of the second predetermined pressure is provided between the plurality of seals of the first seal.

9. The system according to claim 1, further comprising a third channel provided in the body to supply the clean fluid to one or more valve seats of the respective cylinder assembly.

10. The system according to claim 1, wherein the clean fluid is oil provided for lubrication of the power end of the hydraulic fracturing pump.

11. The system according to claim 1, further comprising a spool having a differential area that uses the first predetermined pressure of the fracking fluid output from the fluid end of the hydraulic fracturing pump to pressurize the clean fluid to the minimum of the second predetermined pressure.

12. A system comprising:
a hydraulic fracturing pump to output fracking fluid at a first predetermined pressure and according to a predetermined cycle, the hydraulic fracturing pump being a positive displacement pump and including a power end and a fluid end, the fluid end having a plurality of plungers reciprocally provided in respective ones of a plurality of cylinder assemblies in a body of the fluid end of the hydraulic fracturing pump;

a first seal and a second seal for each of the plurality of cylinder assemblies, the first seal being a dynamic seal provided around the respective plunger and the second seal being a static seal provided at a first end of the respective cylinder assembly;

a clean fluid circuit including a first channel provided in the body to supply clean fluid to the first seal at a minimum of a second predetermined pressure, the second predetermined pressure being greater than the first predetermined pressure associated with the fracking fluid; and a second channel provided in the body to supply the clean fluid to the second seal at the minimum of the second predetermined pressure.

13. The system of claim 12, wherein the first seal is located at a second end of the respective cylinder assembly, the fluid end including an inlet valve and an outlet valve associated with each of the plurality of cylinder assemblies, the inlet valve and the outlet valve located between the first and second ends of the respective cylinder assembly.

14. The system of claim 12, wherein the second seal is provided around a first end cover at the first end.

15. The system of claim 12, wherein the first and second seals are located at opposite ends of the respective cylinder assembly.

16. The system of claim 12, wherein the second seal includes two seals spaced axially from each other.

17. A system comprising:

a hydraulic fracturing pump to output fracking fluid at a first predetermined pressure and according to a predetermined cycle, the hydraulic fracturing pump being a positive displacement pump and including a power end and a fluid end, the fluid end having a plurality of plungers reciprocally provided in respective ones of a plurality of cylinder assemblies in a body of the fluid end of the hydraulic fracturing pump;

a first seal and a second seal for each of the plurality of cylinder assemblies, the first seal being a dynamic seal provided around the respective plunger and the second seal being a static seal provided at a different axial location of the respective cylinder assembly from the first seal;

a clean fluid circuit including a first channel provided in the body to supply clean fluid to the first seal at a minimum of a second predetermined pressure, the second predetermined pressure being greater than the first predetermined pressure associated with the fracking fluid; and a second channel provided in the body to supply the clean fluid to the second seal at the minimum of the second predetermined pressure.

18. The system of claim 17, wherein the second seal is provided around a first end cover at a first end of the respective cylinder assembly.

19. The system of claim 17, wherein the first and second seals are located at opposite ends of the respective cylinder assembly.

20. The system of claim 17, wherein the second seal includes two seals spaced axially from each other.

* * * * *